July 9, 1946.   S. M. MacNEILLE   2,403,730
EXPLOSIVELY ACTUATED HIGH SPEED SHUTTER
Filed March 27, 1943   2 Sheets-Sheet 1
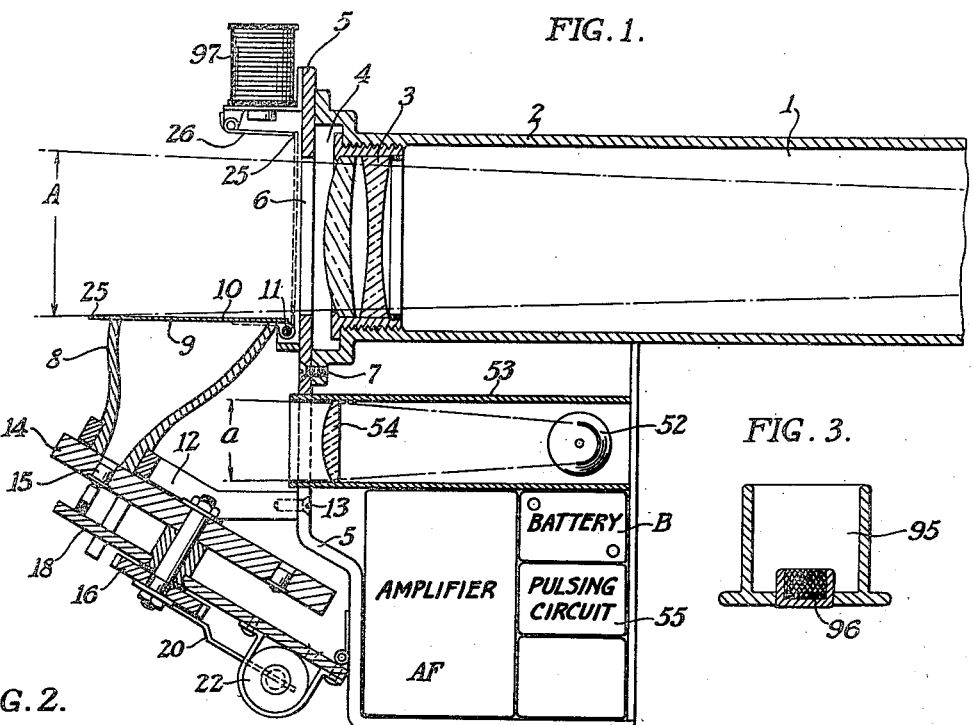
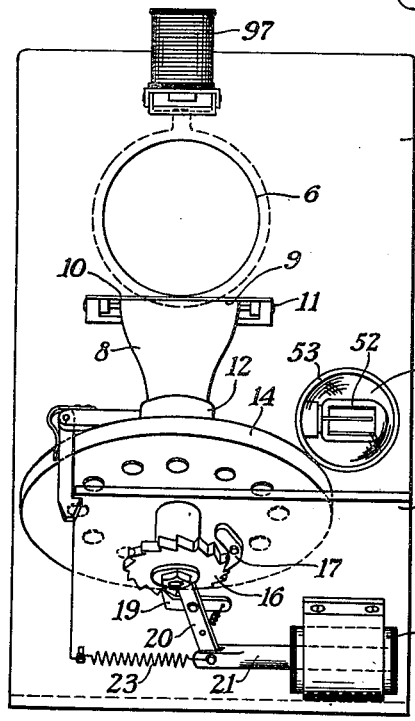
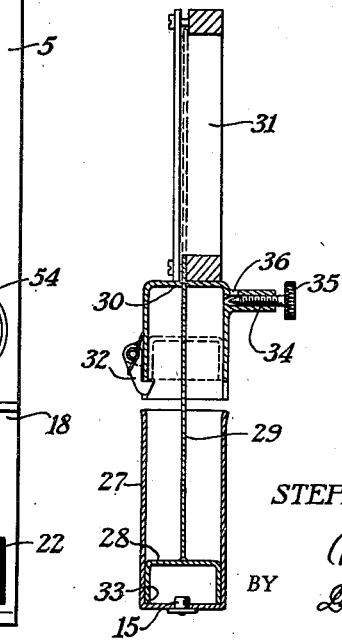
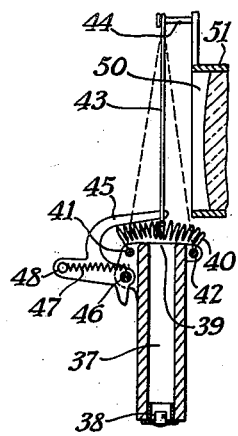
STEPHEN M. MACNEILLE
INVENTOR
ATTORNEYS

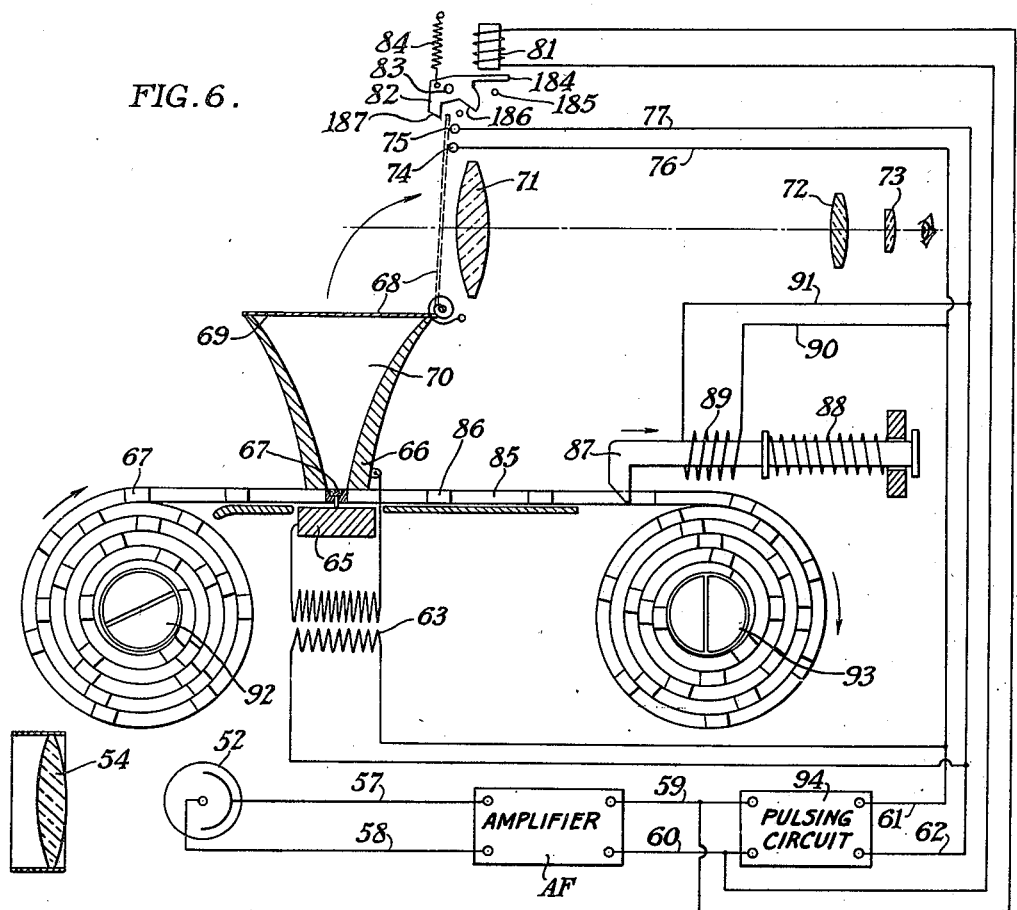
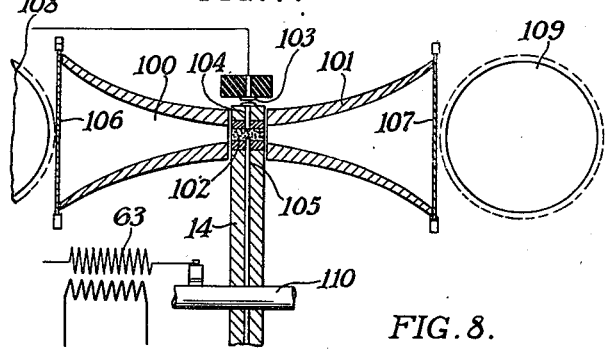
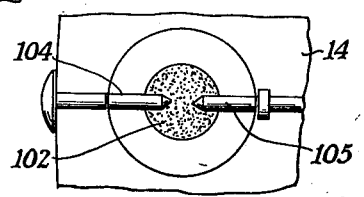
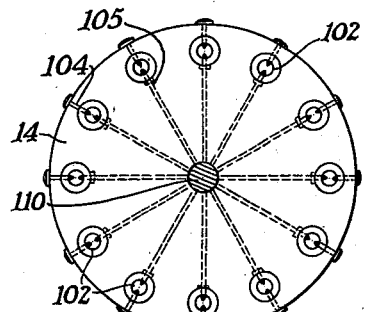
STEPHEN M. MacNEILLE
INVENTOR

Patented July 9, 1946

2,403,730

UNITED STATES PATENT OFFICE 2,403,730

EXPLOSIVELY ACTUATED HIGH-SPEED SHUTTER

Stephen M. MacNeille, Rochester, N. Y., assignor to Eastman Kodak Company, Rochester, N. Y., a corporation of New Jersey Application March 27, 1943, Serial No. 480,797

23 Claims. (Cl. 88—61)

This invention relates to shutters for optical instruments which may be operated at high speed by means of an explosive charge. One object of my invention is to provide a shutter for optical instruments in which there is a light opening which may be covered by a shutter, the prime mover for the shutter being an explosive charge. Another object of my invention is to provide an optical instrument which may magnify a predetermined field of view when an operator looks through the optical instrument and to provide a shutter means which may be operated by a light flash within the field of view of the optical instrument, the shutter being operated with sufficient rapidity to prevent the glare of the light flash from temporarily affecting the vision of the user of the instrument. Another object of my invention is to provide a shutter which is automatically actuated to cut off light entering into an optical instrument to prevent temporarily blinding an operator. Still another object is to provide an explosively actuated shutter which will be set off by means of a photoelectric cell during the start of a flash within the field of view of the optical instrument. Still another object of my invention is to provide an automatically-operated shutter which will close when light in the field of view reaches a predetermined amount and which will be automatically released when light in the field of view is decreased by a predetermined amount. Other objects will appear from the following specification, the novel features being particularly pointed out in the claims at the end thereof.

It has been found that the use of optical instruments, such as range finders, telescopes, field glasses and the like, at night is particularly difficult under war time conditions, because most of these instruments magnify the image being viewed many diameters, and if a flash light bomb or some other sudden flash of light occurs within the field of view of the instrument the user may be temporarily blinded by a flash so that he may be unable to use the instrument for many seconds after the flash occurs, the number of seconds varying with different individuals and with the intensity of the flash and the magnification of the optical systems. It is quite evident that the use of magnifying instruments in aeroplanes is therefore a serious hazard at night, particularly if the enemy should realize that such instruments are being used because they could deliberately set off a series of flash lights or light bombs which would not only render the use of such optical instruments impossible, but in addition the temporary blindness caused by the flashes would be a serious hazard because of the very high speed of modern aeroplanes.

One of the purposes of my invention is to provide an explosively actuated shutter which will move at such a high speed that the optical instrument will be closed as a flash of light in the field of view increases to a point where it would temporarily impair the vision of an operator, so that the instrument would be covered by the shutter until the light is reduced to a harmless extent.

There are many factors used in determining the required speed of the shutter, such as the intensity of the flash, the distance of the flash from the instrument, the rate of increase and decrease of the flash, the magnifying power of the instrument and many other factors. However, it has been found that for an optical instrument having for instance a five-time magnification and perhaps a two-inch opening, a shutter should close the opening in from .9 to 1.3 milliseconds for the average conditions under which the instrument is used. Obviously the different conditions may vary so widely that a special apparatus may be required to meet each set of conditions. To illustrate my invention I will describe a few typical shutters with their associated mechanisms.

I have designed a shutter with which the required high speeds are possible even over the relatively large aperture required.

Coming now to the drawings wherein like reference characters denote like parts throughout:

Fig. 1 is a fragmentary sectional view illustrating one embodiment of my improved shutter attached to one end of an optical instrument, many of the parts being omitted for the sake of clearness;

Fig. 2 is a front plan view of the shutter shown in Fig. 1;

Fig. 3 is an enlarged fragmentary section through one type of explosive charge for actuating the shutter;

Fig. 4 is a fragmentary section through a shutter embodying a second form of my invention;

Fig. 5 is a fragmentary section through a shutter illustrating still another embodiment of my invention;

Fig. 6 is a schematic view of still another type of explosive shutter including a wiring diagram and means for firing an explosive charge each time the shutter is actuated;

Fig. 7 is a fragmentary detail section through an explosively actuated shutter designed to simultaneously actuate two shutters, such as might be used for field glasses for instance;

Fig. 8 is an enlarged fragmentary detail of an explosive charge designed for use with a spark gap; and Fig. 9 is a multiple explosive charge carrier which may be used with one embodiment of my invention.

My invention consists broadly in providing a shutter of such form that it may be moved to close a light aperture with extreme rapidity and to do this in such a manner that a flash light in the field of view of the apparatus will fail to temporarily blind an operator looking through the optical instrument. I have found that quite a number of types of shutters can be used for this purpose and several of the preferred ones will be described.

Referring to Fig. 1, the optical instrument is broadly designated as 1. This instrument as above mentioned may be a relatively high-powered telescope, binocular, range finder or the like, or any other instrument in which an image of a field of view is directly viewed by an operator. If the instrument magnifies the image, my improved shutter is additionally useful because the magnification of the light flash makes such a shutter more necessary to prevent temporary blinding of a user.

The optical instrument may include a tubular member 2, in this case including a lens element 3 near the front of the instrument, there being an opening 4 in front of the lens element. In the embodiment shown in Fig. 1, the shutter includes a plate 5 having a light opening 6 therein of a size to pass the required angle of light A into the instrument. This plate may be attached to the end of the instrument 1 as by screws 7.

The shutter consists of a horn-shaped explosion chamber 8 having a flat top 9 preferably arranged at the angle shown to form a support for a shutter blade 10 hinged at 11 to the plate 5. Tests have shown that this shutter blade can conveniently be made of gray fiber board of substantial thickness because this appears to withstand the explosive charge better than a thin metal plate of aluminum or other suitable material.

The horn-shaped member 8 is carried by a bracket 12 carried by the shutter plate 5 being attached as by screws 13. The bracket 12 likewise rotatably carries a disk 14 which, as best shown in Fig. 9, may carry a series of explosive charges 15 which may be brought into alignment with the explosive chamber 8 by means of a ratchet mechanism 16 shown in Fig. 2. A pawl 17 carried by a plate 18 engages the ratchet 16 tending to hold it in position while a second pawl 19 carried by an arm 20 actuated by the plunger 21 of a solenoid 22 permits a spring 23 to advance the disk 14 a distance to position an explosive charge 15 at each actuation of the shutter as will be hereinafter more fully described.

When the explosive charge 15 goes off, the hinged flap 10 turns rapidly about its pivot 11 until the upper edge of the flap 25 is caught by the latch 26. In the form of the invention shown in Fig. 1 the shutter is made of a flat plate which turns about its hinge. While such a shutter works entirely satisfactorily, other types of shutters such as those shown in Figs. 4 and 5 may be used.

In Fig. 4 the explosive charge 15 is placed in the bottom of a cylinder 27 in which there is a flanged piston 28 carrying a rigid shutter blade 29 passing up through a slot 30 in the top of the tubular casing. When the explosive charge 15 is ignited the piston moves upwardly rapidly causing the shutter blade 29 to cross the opening 31 of the shutter so as to close it and at the upper extent of its movement a spring latch 32 will engage a lower edge 33 of the piston 28 to hold the shutter in its raised position. If desired, a needle valve consisting of a threaded needle 34 may be adjusted by a handle 35 to vary the escape of air through a vent 36 and thus cushion the stroke of the piston 28 as it approaches its fully closed position.

In Fig. 5 I have shown a tubular combustion chamber 37 for the explosive charge 38 which may be mounted in the bottom. Over the open top 39 of this chamber I prefer to mount a flexible shutter curtain 40, being attached at 41 and 42 to transverse bars across the open end of the combustion chamber 39. The curtain 40 may be made of any sufficiently strong flexible material, such as leather, goat skin or the like, and it may conveniently be folded back and forth as shown. An elastic band 43 passes through a fold in the curtain and is attached to an upper bracket 44 tending to move the curtain up, but this tendency is restrained by a latch member 45 pivoted to move about a pivot 46 and including a spring 47 attached to the arm 48 and to the combustion chamber 37 in such a manner that when the arm 45 is raised the latch member will move in a counter-clockwise direction and the spring 47 will hold the latch in a position in which the arm 45 no longer restrains the movement of the elastic band 43 and the folded curtain. Thus when the explosive charge 38 goes off, the curtain 40 is rapidly moved to the broken line position in which it will block light from entering the opening 50 at the end of the optical instrument 51.

Regardless of what type of shutter is employed, it is necessary to cause the shutter to move with extreme rapidity when light of sufficient intensity comes within the field of view of the optical instrument. In order to do this I provide a photoelectric cell 52 which may be mounted in a tubular member 53 behind a lens 54. This lens may be omitted if the instrument is to be rendered less sensitive. The tube 53 is so arranged that the angle $a$ is the same as the angle A of the optical instrument. Consequently, only light coming within the field of view of the optical instrument will fall upon the light-sensitive cell 52. Beneath the light-sensitive cell I prefer to mount the necessary electrical equipment, such as an amplifier AF, battery B and the pulsing circuit container 55.

Referring to Fig. 6 in which a typical circuit is shown, it will be noticed that the photocell 52 may receive light rays through the lens 54 focused upon it and when this occurs the amplifier AF, which may be one of a number of known types, activated by comparatively weak current through the wires 57 and 58, may fire the explosive charge, move a fresh explosive charge into position, and release the shutter after the light has died down.

The amplifier may be of a known type including one or more vacuum tubes which, through the wires 59 and 60, pass a current to a pulsing circuit unit 94 which is of the known type that makes a pulse when the input rises above a set voltage. When the light sensitive cell 52 generates enough current the pulsing circuit unit will send a pulse through wires 61 and 62 to a spark coil 63 which will, as indicated in this figure, cause a spark between the terminal 65 and 66 to fire the explosive charge 67, thus operating the shutter plate 68 moving it from its seat 69 on the horn-shaped explosive chamber 70 to the broken line position in front of the lens 71 which forms a part of an optical system including lenses 72 and 73.

When the shutter 68 moves to the broken line position in Fig. 6, it closes a switch by contacting with the terminals 74 and 75, thereby completing a circuit through the wires 76 and 77, which will short circuit any pulse which might fire the next explosive charge or move a new charge into the chamber while the shutter is closed. When the light, which may be focused upon the photocell 52 by a lens 54, falls below a predetermined brilliance, the current in the solenoid 81 from amplifier 53 will be insufficient to hold latch 82 and the latter will rotate about its pivot 83 under the torque exerted by spring 84, releasing shutter 68 and permitting a light spring 68S to return the shutter to its seat 69. In this position the latch is held by spring 84 with arm 184 resting on stop pin 185. When the shutter 68 moves up again after an explosive charge is fired, the end of the shutter strikes latch arm 186 swinging it into a position in which it will be held by the solenoid 81 as shown in Fig. 6. If by any chance the latch 82 was already raised to the Fig. 6 position the shutter leaf strikes the beveled surface 187 turning the latch clockwise a direction to permit the blade to pass, after which it strikes arm 186 and moves the latch counter-clockwise again on into the Fig. 6 position.

A preferred means of moving explosive charges into the horn 70 may be the tape 85 which carries a series of pockets 86 each of which contains an explosive charge 67. In order to move this tape to place a fresh charge into place a pulldown claw 87 is provided and is normally moved by means of a spring 88 toward the horn, but a coil 89 is connected by wires 90 and 91 to wires 61 and 62 which lead to the terminals of the first-mentioned pulsing circuit unit which, as above explained, is of the type which makes a pulse when the input rises above a set voltage. Therefore, when the spark coil is actuated the coil 89 also causes the pulldown 87 to move toward the right of Fig. 6, thus unwinding the flexible tape 85 from its supply roll 92 to the take-up roll 93.

The operation of the device shown in Fig. 6 is as follows. Assuming an operator is looking through the eyepiece 73 of the optical instrument while the shutter 68 remains in its full line position, if a light bomb should explode within the angle of view of the optical instrument, the lens 54 by focusing the light upon the cell 52 amplifies the current generated by the cell 52 and the pulsing circuit unit 94 makes a pulse as soon as the input rises above a set voltage. This is desirable for two reasons. First, if the light is not sufficiently brilliant, then the pulsing circuit unit will not make a pulse and fire the explosive charge 67. Second, if the light is sufficiently brilliant, as soon as it reaches a sufficient intensity a pulse is made and the spark coil immediately fires the explosive charge 67, closing the shutter 68 as it is rapidly swung to its dotted line position in which it excludes light from the optical instrument. At the same time a fresh explosive charge is rapidly moved into position by the pulldown claw 67. As long as the light is of damaging brilliance, the shutter will remain in a closed position because of the current in solenoid 81 is sufficient to prevent latch 82 from releasing it. Consequently, just as soon as the intensity of the disturbing light is reduced to a harmless extent the current in the solenoid will fall causing the shutter 68 to fall back to its normal position of rest enabling an operator to again sight through the instrument. If a second light bomb comes within range during the time the shutter remains closed, no harm is done because the shutter will remain closed until any light within the field of view of the instrument has dropped to a harmless extent.

In general the circuit may be the same for the embodiment of my invention shown in Fig. 1 as the circuit shown in Fig. 6. However, the method of moving a fresh charge into position is different as described above.

The explosive charges may be of various types, but I have found that a squib, such as furnished in several sizes by the Hercules Powder Company and one of which may contain approximately a .0005 cubic inch of explosive, is satisfactory for a shutter of the type described in which the light opening of the shutter is approximately two inches, but of course the explosive charge should be altered to suit the particular setup at hand. Such a charge as shown in Fig. 3 may include a metal cartridge 95 with the explosive charge 96 mounted in the base in such a way that it can be exploded by a spark from a suitable circuit or from a hot wire. The spark gap is a more satisfactory method as a quicker response can ordinarily be obtained in this way.

In Figs. 1 and 2 a solenoid 97 is employed to release the shutter latch 26 in the same manner as the latch 82 of Fig. 6 is released.

If it is desirable to utilize shutters on optical instruments of the binocular type the arrangement shown in Fig. 7 may be used in which a pair of horn-shaped combustion chambers 100 and 101 face in opposite directions from an explosive charge 102 carried by the disk 14 of Fig. 9 so that when a spark coil 63 causes current to pass through the terminal 103—104 a spark will pass between 104 and 105 and cause the charge 102 to explode, thus closing the spaced shutters 106 and 107, thereby preventing light from entering the openings 108 and 109 of the binoculars.

As shown in Fig. 9, a disk 14 may carry a plurality of charges 102 and this disk is mounted to rotate on a shaft 110 so that one charge after another may be rotated into position between the two horns. Each explosive charge 102 may be as shown in Fig. 8—that is provided with a pair of terminals 104 and 105 across which a spark may jump when the spark coil is energized.

The particular circuit employed to accomplish the results described above is not important as long as it is one that is capable of producing an extremely rapid response and as long as it is one which will fire the explosive charge immediately when a light within the angle of view of the optical instrument reaches sufficient intensity to fire the charge.

I have described a number of different types of shutters which have been found satisfactory for my purpose and it is obvious that other forms which would be satisfactory can be designed providing the explosive charge can act upon the shutter directly to cause the necessary very rapid movement of the shutter. It is not necessary to provide a shutter which makes a definitely light-tight joint between the light opening of the shutter and the shutter blade or curtain because all this shutter needs to do is block off light entering the opening from a fixed angle of view. It might be supposed, with the construction shown in Fig. 1 and some of the other figures, that the light from the explosion would be a disturbing factor. Such is not the case. Repeated tests have shown that the shutter blade alone is sufficient to block off light from the explosion charge so that it cannot pass into the optical instrument.

It is also obvious that the time of the opening of the shutter is not particularly important because the shutter is only released after light in the field of view of the instrument drops to a predetermined amount and the instrument is so adjusted that this amount of light is not disturbing to the eye of an operator even if the shutter should open before the light is entirely extinguished. A principal requirement of my invention is that the shutter must be capable of closing or cutting off light with extreme rapidity before the light can temporarily blind the eye of the operator using the instrument. Since the shutter must not start to operate until the light intensity reaches a dangerous degree, this makes an excessively high speed essential for the proper operation of the machine.

I may use either rigid or flexible shutter blades. Where I refer to shutter blade in the claims I mean to use it in its broadest sense to include either the flexible fabric or leather shutters or the rigid or semi-rigid type of shutter blades.

I claim:

1. A shutter for optical apparatus including an objective through which light rays may pass, said shutter including a support having a light opening aligned with the objective, a movably mounted shutter leaf carried by the support, an explosive charge holder so positioned that the shutter leaf may be directly engaged by the products of combustion and moved by firing the explosive charge, and means for firing the explosive charge.

2. A shutter for optical apparatus including an objective through which light rays may pass, said shutter including a support having a light opening aligned with the objective, a shutter leaf movably carried by the support, a tubular member mounted on the support and normally supporting the shutter leaf, means for positioning an explosive charge in the tubular member, and means for firing the explosive charge to propel the shutter leaf across the light opening.

3. A shutter for optical apparatus including an objective through which light rays may pass, said shutter including a support having a light opening aligned with the objective, a shutter leaf movably carried by the support, a tubular member mounted on the support and normally supporting the shutter leaf, means for positioning an explosive charge in the tubular member, and means for firing the explosive charge to propel the shutter leaf across the light opening and a latch carried by the support for holding the shutter leaf across the light opening.

4. A shutter for optical apparatus including an objective through which light rays may pass, said shutter including a support having a light opening aligned with the objective, a shutter leaf movably carried by the support, a horn mounted on the support, an explosive charge carrier in said horn, the horn being positioned near the light opening and including a rest for the shutter leaf, means for firing an explosive charge carried by the horn for rapidly moving the shutter leaf therefrom and across the light opening, and means for holding the shutter leaf over the light opening after such movement.

5. A shutter for optical apparatus including an objective through which light rays may pass, said shutter including a support having a light opening aligned with the objective, a pivotally mounted shutter leaf carried adjacent the light opening, a horn angularly mounted on the support and including an outwardly flared flange normally supporting the shutter leaf, means for holding an explosive charge at the opposite end of the horn, means for firing the explosive charge to turn the shutter leaf about its hinge and across the light opening.

6. A shutter for optical apparatus including an objective through which light rays may pass, said shutter including a support having a light opening aligned with the objective, a pivotally mounted shutter leaf carried adjacent the light opening, a horn angularly mounted on the support and including an outwardly flared flange normally supporting the shutter leaf, means for holding an explosive charge at the opposite end of the horn, means for firing the explosive charge to turn the shutter leaf about its hinge and across the light opening, said means including a spark gap, a light-sensitive cell and an amplifier.

7. A shutter for optical apparatus including an objective through which light rays may pass, said shutter including a support having a light opening aligned with the objective, a movably mounted shutter leaf carried by the support, an explosive charge holder mounted on the support and normally covered by the shutter leaf so that the shutter leaf may be acted upon by the products of combustion and thereby moved by firing the explosive charge, and means for firing the explosive charge, comprising a spark gap at the explosive charge, a light-sensitive cell and an amplifying circuit for releasing a spark at the spark gap when a predetermined amount of light falls on said light-sensitive cell.

8. A shutter for optical apparatus including an objective through which light rays may pass, said shutter including a support having a light opening aligned with the objective, a movably mounted shutter leaf carried by the support, an explosive charge holder so positioned to normally support the shutter leaf so that the shutter leaf may be acted upon by the products of combustion and thereby moved by firing the explosive charge, and means for firing the explosive charge, comprising a spark gap at the explosive charge, a light-sensitive cell and an amplifying circuit for releasing a spark at the spark gap when a predetermined amount of light falls on said light-sensitive cell, the objective including light rays of a predetermined angle, an objective having a similar angle for focusing light on the light-sensitive cell whereby light of a predetermined brilliance in the field of said lenses may cause the shutter to function automatically.

9. An optical instrument for viewing objects at a distance including an objective, a light opening, and a shutter adjacent the light opening including a shutter leaf, a support for the shutter leaf on which the leaf may lie in a normal position, means adjacent the support on which said leaf may lie and adapted to carry an explosive charge, and means for firing the explosive charge to move the shutter leaf from its normal position to a position closing the light opening of the optical instrument, and a circuit including a light-sensitive cell and amplifier for firing the explosive charge when sufficient light falls upon said light-sensitive cell.

10. An optical instrument for viewing objects at a distance including an objective, a light opening, and a shutter adjacent the light opening including a shutter leaf, a support for the shutter leaf on which the leaf may lie in a normal position, means adjacent the support on which said leaf may lie and adapted to carry an explosive charge, and means for firing the explosive charge to move the shutter leaf through contact with the products of combustion from its normal position to a position closing the light opening of the optical instrument, and a circuit including a light-sensitive cell and amplifier for firing the explosive charge when sufficient light falls upon said light-sensitive cell, a latch for holding the shutter leaf after its actuation by the explosive charge to a position across the light opening, and means for releasing the latch.

11. An optical instrument for viewing objects at a distance including an objective, a light opening, and a shutter adjacent the light opening including a shutter leaf, a support for the shutter leaf on which the leaf may lie in a normal position, means adjacent the support on which said leaf may lie and adapted to carry an explosive charge, and means for firing the explosive charge to move the shutter leaf through contact with the products of combustion from its normal position to a position closing the light opening of the optical instrument, and a circuit including a light-sensitive cell and amplifier for firing the explosive charge when sufficient light falls upon said light-sensitive cell, a latch for holding the shutter leaf after its actuation by the explosive charge to a position across the light opening, a light spring tending to move the shutter to its normal position of rest, and means for releasing the shutter leaf holding latch.

12. An optical instrument for viewing objects at a distance including an objective, a light opening, and a shutter adjacent the light opening including a shutter leaf, a support for the shutter leaf on which the leaf may lie in a normal position, means adjacent the support on which said leaf may lie and adapted to carry an explosive charge, and means for firing the explosive charge to move the shutter leaf from its normal position to a position closing the light opening of the optical instrument, and a circuit including a light-sensitive cell and amplifier for firing the explosive charge when sufficient light falls upon said light-sensitive cell, a latch for holding the shutter leaf after its actuation by the explosive charge to a position across the light opening, a light spring tending to move the shutter to its normal position of rest, and means for releasing the shutter leaf holding latch including a means for delaying the release of the shutter leaf holding latch.

13. An optical instrument for viewing objects at a distance including an objective, a light opening, and a shutter adjacent the light opening including a shutter leaf, a support for the shutter leaf on which the leaf may lie in a normal position, means adjacent the support on which said leaf may lie and adapted to carry an explosive charge, and means for firing the explosive charge to move the shutter leaf from its normal position to a position closing the light opening of the optical instrument, and a circuit including a light-sensitive cell and amplifier for firing the explosive charge when sufficient light falls upon said light-sensitive cell, a latch for holding the shutter leaf after its actuation by the explosive charge to a position across the light opening, a light spring tending to move the shutter to its normal position of rest, and means for releasing the shutter leaf holding latch including an electrical circuit, a solenoid in the circuit for operating the latch and an amplifying device for passing current to the solenoid for releasing the shutter.

14. In an optical instrument having a predetermined field of view and of the telescope type, the combination with said optical instrument, of a shutter movably mounted thereon for movement to and from a light excluding position in which light is prevented from passing through said optical instrument, means for operating the shutter including a light-sensitive cell, means for controlling the angle of light reaching the light-sensitive cell to substantially the angle of view of the optical element, a circuit for operaing the shutter under the control of the light-sensitive cell whereby said shutter may be automatically operated by a light in the field of view of the optical instrument, said means for operating the shutter including an explosive charge directly acting upon and moving the shutter directly from the combustion thereof, and electrically actuated means under control of the light-sensitive cell for firing the explosive charge.

15. An optical instrument having a field of view through which objects may be observed on an enlarged scale and including an objective, a light opening, a movable shutter leaf adjacent the light opening, a combustion chamber on which the shutter leaf may normally rest and adapted to hold an explosive charge to actuate the shutter and an electrical circuit including a photocell, amplifier unit, and spark coil for firing the explosive charge to actuate the shutter, said electrical circuit including a pulsing device adapted to make a pulse when the input from the photocell reaches a predetermined set voltage whereby a light within the field of the optical instrument may automatically fire the explosive charge upon reaching a predetermined brilliance.

16. An optical instrument having a field of view through which objects may be observed on an enlarged scale and including an objective, a light opening, a movable shutter leaf adjacent the light opening, a combustion chamber on which the shutter leaf may normally rest and adapted to hold an explosive charge to actuate the shutter and an electrical circuit including a photocell, amplifier unit, and spark coil for firing the explosive charge to actuate the shutter, said electrical circuit including a pulsing device adapted to make a pulse when the input from the photocell reaches a predetermined set voltage, a latch for holding said movable shutter over said light opening, and means for releasing said latch when the current from the photocell falls below a predetermined valve.

17. An optical instrument having a field of view through which objects may be observed on an enlarged scale and including an objective, a light opening, a movable shutter leaf adjacent the light opening, a combustion chamber on which the shutter leaf may normally rest and adapted to hold an explosive charge to actuate the shutter and an electrical circuit including a photocell, amplifier unit, and spark coil for firing the explosive charge to actuate the shutter, said electrical circuit including a pulsing device adapted to make a pulse when the input from the photocell reaches a predetermined set voltage, means carrying a plurality of explosive charges positioned to pass said combustion chamber, means including a pawl for advancing said explosive charge carrying device to position a fresh explosive charge, and means for moving said pawl comprising a solenoid in said circuit energized by a pulse from the first mentioned pulsing device whereby a fresh explosive charge is positioned automatically each time an explosive charge is exploded.

18. A shutter for optical instruments including an objective for forming an image of a field of view, a light aperture through which light rays pass in the optical instrument, a shutter mounted for movement to and from the light aperture to pass and exclude light therefrom, means for holding an explosive charge to act directly upon and operate the shutter, a light-sensitive cell, amplifier and circuit for controlling the explosive charge acting directly upon the shutter, means for controlling the light falling on the light-sensitive cell to include substantially the same area as the field of view of the optical instrument whereby said light-sensitive cell may only be affected by light in the field of view of the optical instrument.

19. A shutter for optical instruments including an objective for forming an image of a field of view, a light aperture through which light rays pass in the optical instrument, a shutter mounted for movement to and from the light aperture to pass and exclude light therefrom, means for holding an explosive charge to act directly upon and operate the shutter, a light-sensitive cell, amplifier and circuit for controlling the explosive charge acting directly upon the shutter, means for controlling the light falling on the light-sensitive cell to include substantially the same area as the field of view of the optical instrument, a pulsing device in the circuit of the type making a pulse when input from the cell rises above a set voltage, whereby said circuit for controlling the shutter may be energized only when a light above a predetermined brilliance is in the field of view of the optical instrument.

20. A shutter for optical instruments including an objective for forming an image of a field of view, a light aperture through which light rays pass in the optical instrument, a shutter mounted for movement to and from the light aperture to pass and exclude light therefrom, a light-sensitive cell, amplifier and circuit for controlling the shutter, means for controlling the light falling on the light-sensitive cell to include substantially the same area as the field of view of the optical instrument, a pulsing device in the circuit of the type making a pulse when input from the cell rises above a set voltage, whereby said circuit for controlling the shutter may be energized only when a light above a predetermined brilliance is in the field of view of the optical instrument, a latch for holding the shutter leaf over the aperture, and means for releasing said latch when a light in the field of view of the optical instrument drops below a predetermined brilliance.

21. A shutter for optical instruments including an objective for forming an image of a field of view, a light aperture through which light rays pass in the optical instrument, a shutter mounted for movement to and from the light aperture to pass and exclude light therefrom, means for holding an explosive charge to act directly upon and operate the shutter, a light-sensitive cell, amplifier and circuit for controlling the explosive charge acting directly upon the shutter, means for controlling the light falling on the light-sensitive cell to include substantially the same area as the field of view of the optical instrument, said electric circuit also including means for closing the shutter and means for opening the shutter, both operable in accordance with the intensity of light falling on said light-sensitive cell.

22. A shutter for optical apparatus including an objective through which light rays may pass, said shutter including a support having a light opening alined with the objective, and explosive charge holder, a shutter leaf movably carried by the support and positioned adjacent to the explosive charge holder, a prime mover for moving the shutter leaf comprising an explosive charge the products of combustion of which may act directly upon the shutter leaf from the explosive charge holder, and means for firing the explosive charge.

23. An optical instrument for viewing objects at a distance including an objective, a light opening, and a shutter adjacent the light opening including a shutter leaf, a support for the shutter leaf on which the leaf may lie in a normal open position, means adjacent the support on which the leaf may lie and adapted to carry an explosive charge, and means for firing the explosive charge to cause the products of the combustion of the explosive charge to act directly upon and to move the shutter leaf from its normal open position to a position closing the light opening of the optical instrument.

STEPHEN M. MacNEILLE.